United States Patent
Koga

(10) Patent No.: US 11,280,771 B2
(45) Date of Patent: Mar. 22, 2022

(54) LIQUID CHROMATOGRAPH

(71) Applicant: Shimadzu Corporation, Kyoto (JP)

(72) Inventor: Yosuke Koga, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 71 days.

(21) Appl. No.: 16/985,429

(22) Filed: Aug. 5, 2020

(65) Prior Publication Data

US 2021/0080436 A1 Mar. 18, 2021

(30) Foreign Application Priority Data

Sep. 12, 2019 (JP) .............................. JP2019-166183

(51) Int. Cl.
*G01N 30/86* (2006.01)
*G01N 30/02* (2006.01)

(52) U.S. Cl.
CPC ....... *G01N 30/86* (2013.01); *G01N 2030/027* (2013.01)

(58) Field of Classification Search
CPC ............. G01N 30/86; G01N 2030/027; G01N 30/8658; G01N 30/88; G01N 2030/8804; G01N 30/34; G01F 23/20
See application file for complete search history.

(56) References Cited

U.S. PATENT DOCUMENTS

| | | | |
|---|---|---|---|
| 6,315,901 B1 | 11/2001 | Okada | |
| 10,345,134 B2 * | 7/2019 | Vander Putten | ..... G01G 19/414 |
| 2008/0289691 A1 * | 11/2008 | Roberge | ............... G05D 7/0635 |
| | | | 137/2 |
| 2015/0346014 A1 * | 12/2015 | Vander Putten | ....... G01G 17/04 |
| | | | 73/296 |
| 2019/0046102 A1 * | 2/2019 | Kushnir | .................. G01F 23/20 |
| 2020/0360604 A1 * | 11/2020 | Kolko | ............... A61M 5/16845 |
| 2021/0356445 A1 * | 11/2021 | Yoshida | ............. G01N 30/8631 |

FOREIGN PATENT DOCUMENTS

JP 2000-298122 A 10/2000
JP 2008-145122 A 6/2008

* cited by examiner

*Primary Examiner* — David J Bolduc
(74) *Attorney, Agent, or Firm* — Maier & Maier, PLLC

(57) ABSTRACT

A liquid chromatograph that accurately detects, with a weight sensor, a remaining amount of a mobile phase during analysis and also an operation onto a system such as whether or not a container has been placed and whether or not the mobile phase has been added is provided. A container stores a mobile phase. A sensor detects a weight of the container in which the mobile phase is stored. A filter smoothens a signal output from the sensor and outputs the smoothened signal. A calculator calculates a liquid amount of the mobile phase stored in the container based on the signal output from the filter. When variation per unit time of the signal output from the sensor is larger than a prescribed threshold value, the filter has a smaller time constant for smoothening than when variation is smaller than the threshold value.

8 Claims, 8 Drawing Sheets

LIQUID CHROMATOGRAPH

BACKGROUND OF THE INVENTION

Field of the Invention

The present invention relates to a liquid chromatograph.

Description of the Background Art

A liquid chromatograph is constituted of a plurality of analysis units such as a pump, an autosampler, a column oven, and a detector. In such a liquid chromatograph, a mobile phase is used in analysis of a sample. Therefore, in order to avoid running out of the mobile phase during analysis, it is important to know a remaining amount of the mobile phase during analysis. For example, Japanese Patent Laying-Open No. 2000-298122 describes measurement means for directly measuring a remaining amount of a mobile phase in a mobile phase bottle.

SUMMARY OF THE INVENTION

A method of monitoring, by placing a container that stores a mobile phase on a weight sensor, a state of use of the mobile phase little by little during analysis based on a signal from the weight sensor has been known as one of methods of directly measuring a remaining amount of the mobile phase.

In general, variation per unit time of a signal from a weight sensor caused by consumption of a mobile phase during analysis is much smaller than variation of a signal from the weight sensor caused by vibration of an analysis apparatus or vibration under normal conditions. Therefore, a signal output from the weight sensor is subjected to filtering processing by a filter having a time constant large to such an extent as attenuating a high-frequency component of the output signal. Noise is thus removed to accurately find an amount of consumed mobile phase during analysis.

In such a configuration, an operation onto a system that brings about abrupt change of a signal output from the weight sensor can also be detected. For example, when variation per unit time of a signal output from the weight sensor is large in a direction of increase, placement of a container on the weight sensor or additional injection of the mobile phase can be detected. When variation of a signal from the weight sensor is large in a direction of decrease, removal of the container from the weight sensor can be detected.

Use of the filter large in time constant as in a conventional example, however, makes variation of a filtered signal gentle even though variation of the signal from the weight sensor is abrupt. Therefore, there is a concern, for example, about erroneous determination as to whether or not a container has been placed on a weight sensor. Furthermore, for example, there is a concern about deviation from an actual amount, of a remaining amount measured by the weight sensor at the time when the mobile phase is additionally injected into the container. Namely, there is a room for improvement in responsiveness at the time when an operation onto the system as above is performed.

The present invention was made to solve such a problem, and an object thereof is to provide a liquid chromatograph that can accurately detect, with a weight sensor, a remaining amount of a mobile phase during analysis and also an operation onto a system such as whether or not a container has been placed or whether or not a mobile phase has additionally been injected.

A first aspect of the present invention relates to a liquid chromatograph including a container, a sensor, a filter, and a calculator. The container stores a mobile phase. The sensor detects a weight of the container in which the mobile phase is stored. The filter smoothens a signal output from the sensor and outputs the smoothened signal. The calculator calculates a liquid amount of the mobile phase stored in the container based on the signal output from the filter. When variation per unit time of the signal output from the sensor is larger than a prescribed threshold value, a time constant of the filter for smoothening is smaller than when variation is smaller than the threshold value.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
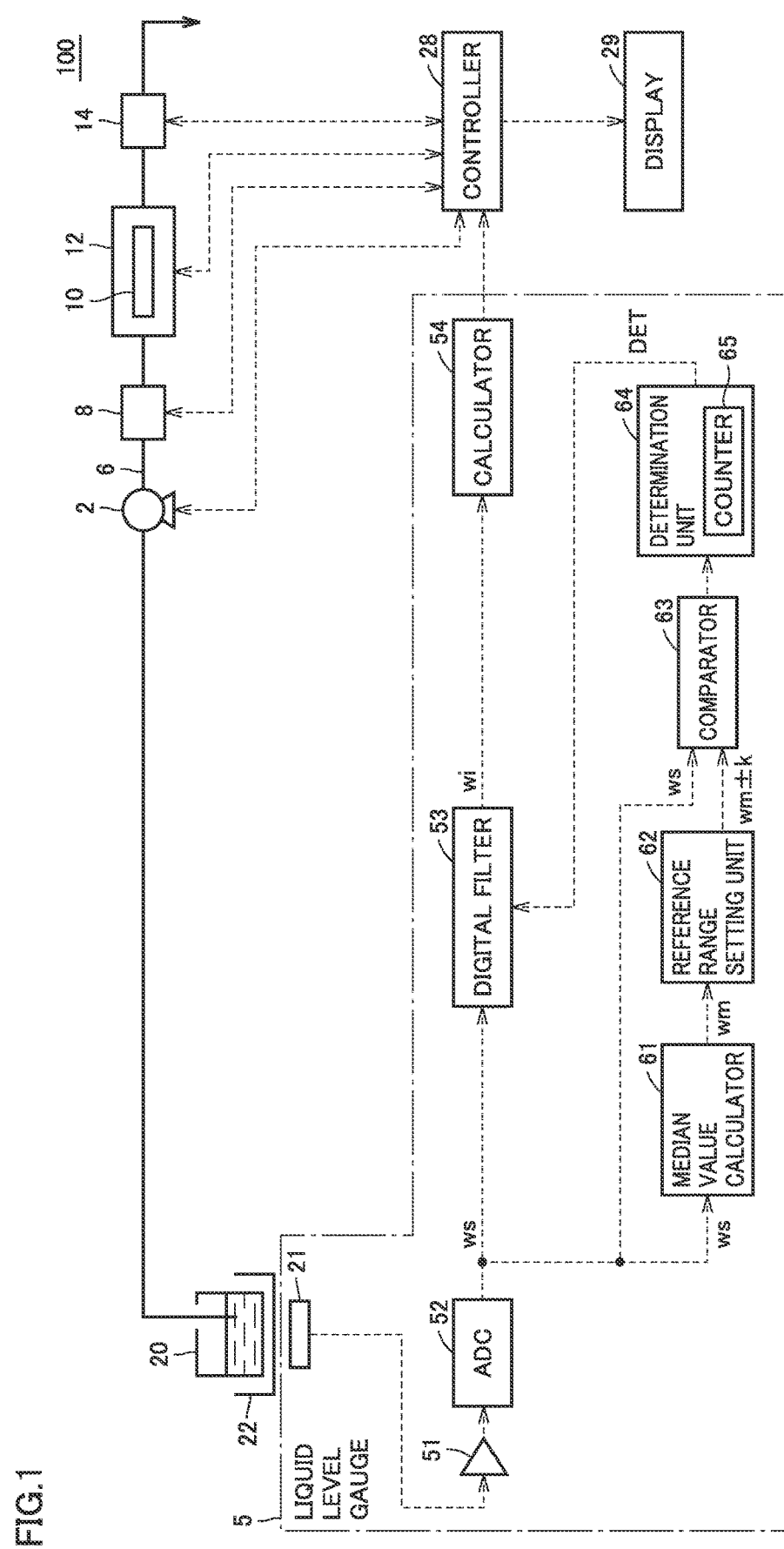
FIG. 1 is a schematic diagram showing a configuration of a liquid chromatograph according to the present embodiment.

An embodiment of the present invention will be described below in detail with reference to the drawings. The same or corresponding elements in the drawings below have the same reference characters allotted and description thereof will not be repeated in principle.

(Apparatus Configuration)

FIG. 1 is a block diagram showing a configuration of a liquid chromatograph 100 according to the present embodiment. Referring to FIG. 1, liquid chromatograph 100 includes a container 20, a pump 2, an analysis flow path 6, an autosampler 8, a column oven 12 that contains a column 10, a detector 14, a liquid level gauge 5, a controller 28, and a display 29. Overview of liquid chromatograph 100 will be described below.

Pump 2 suctions a mobile phase in container 20 that stores the mobile phase and delivers the mobile phase into analysis flow path 6.

Along analysis flow path 6, autosampler 8, column 10, and detector 14 are arranged from upstream to downstream of a flow of the mobile phase. Autosampler 8 introduces a sample into the mobile phase within analysis flow path 6.

Column 10 separates the sample introduced into autosampler 8. Detector 14 detects a sample component separated by column 10. For example, a mass spectrometer or an absorbency detector can be employed as detector 14. Each apparatus used for analysis of a sample such as pump 2, autosampler 8, column 10, or detector 14 in liquid chromatograph 100 is also referred to as a "unit" below. Each component of liquid chromatograph 100 will be described in detail below.

In the present embodiment, container 20 stores, for example, a mobile phase such as pure water, ethanol, or acetonitrile.

Controller 28 controls an operation of each unit. Specifically, controller 28 stores an analysis program for controlling an operation of each component of the liquid chromatograph in analysis and controls each unit in accordance with the analysis program to conduct prescribed analysis. The program can also include a program for performing processing for creating a chromatogram by processing a detection signal from detector 14 and processing for quantifying a component to be analyzed by holding calibration curve data.

Liquid chromatograph 100 further includes liquid level gauge 5 that measures a liquid amount (which is also referred to as a "stored amount" below) of the mobile phase stored in container 20. Liquid level gauge 5 may be provided integrally with the liquid chromatograph or may externally be attached to the liquid chromatograph. Controller 28 can receive information on the stored amount of the mobile phase from liquid level gauge 5.

Liquid level gauge 5 includes a weight sensor (load cell) 21, an amplifier 51, an analog-digital converter (ADC) 52, a digital filter (which is also simply referred to as a filter below) 53, a calculator 54, a median value calculator 61, a reference range setting unit 62, a comparator 63, and a determination unit 64.

Weight sensor (load cell) 21 is provided on a bottom surface side of container 20 set in a bottle holder 22. Weight sensor 21 senses a weight of container 20 and outputs an analog signal indicating a detection value to amplifier 51. The weight of the container herein refers to a weight including a weight of the mobile phase stored in the container. Amplifier 51 amplifies an analog signal received from weight sensor 21 and outputs the analog signal to analog-digital converter 52. Analog-digital converter 52 receives the analog signal from amplifier 51, converts the analog signal into a digital signal by sampling the analog signal over a prescribed sampling period, and outputs the digital signal to filter 53.

Filter 53 smoothens the signal received from analog-digital converter 52 and outputs the smoothened signal to calculator 54. Calculator 54 receives the signal from filter 53 and finds the weight of container 20 based on the signal. Calculator 54 reads a calibration curve corresponding to a type of the mobile phase stored in the container from a not-shown storage, and calculates a stored amount of the mobile phase from the weight of container 20 based on the read calibration curve.

Median value calculator 61, reference range setting unit 62, comparator 63, and determination unit 64 will be described later.

Liquid chromatograph 100 can notify an analyzer of the calculated stored amount of the mobile phase, for example, by showing the stored amount on display 29. The analyzer can thus more readily know the stored amount of the mobile phase.

Controller 28 is typically implemented by a computer and can be implemented by a dedicated computer or a general-purpose personal computer. Examples of the dedicated computer include a system controller. When the controller is implemented by the system controller, liquid chromatograph 100 can be connected to a not-shown external personal computer (PC) through a network.

Though a load cell is adopted as the weight sensor in the present embodiment, a weight sensor other than the load cell may be employed so long as it can measure a weight of the container. The weight of the container herein refers to a weight including a weight of a mobile phase stored in the container as described above. Therefore, when a stored amount of the mobile phase is zero, the weight of the container is equal to a net weight of the container.

Weight sensor 21 may be substituted with another sensor that measures a liquid amount of the mobile phase stored in the container. For example, weight sensor 21 may be substituted with another sensor such as a liquid level sensor that uses ultrasound or laser. In this case, a function of each component of liquid level gauge 5 which will be described later is also modified as appropriate. Denotation simply as a "sensor" herein below refers to weight sensor 21.

Figure 2:
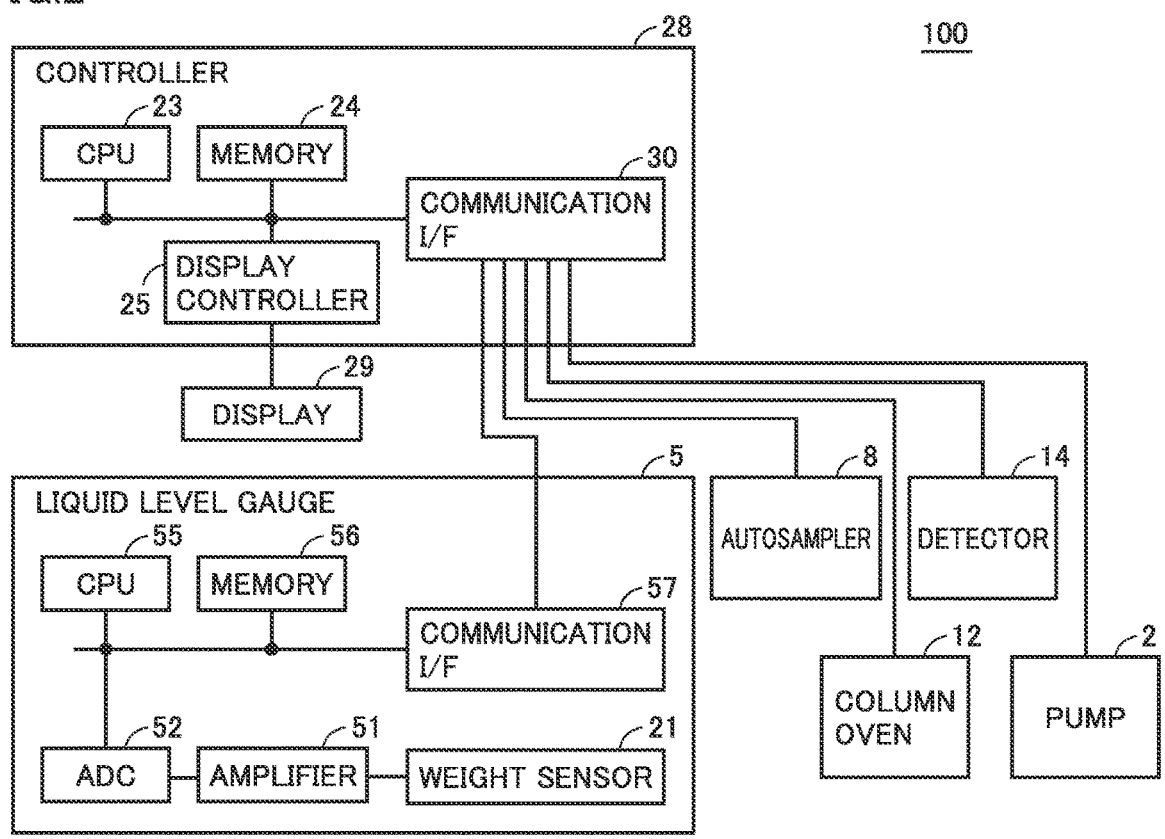
FIG. 2 is a diagram schematically showing a configuration of a controller and a liquid level gauge.

FIG. 2 is a diagram schematically showing a configuration of controller 28 and liquid level gauge 5.

(Description of Controller 28)

Controller 28 includes a CPU 23, a memory 24, a display controller 25, and a communication interface (which is also referred to as a communication I/F below) 30. Components of controller 28 are connected through a common system bus and can supply and receive a signal to and from one another through the system bus.

Controller 28 operates in accordance with a program stored in memory 24. Memory 24 includes a read only memory (ROM), a random access memory (RAM), and a hard disk drive (HDD) which are not shown.

The ROM can store a program to be executed by CPU 23. The program includes a program relating to control of liquid chromatograph 100 and a program relating to processing of data obtained by liquid chromatograph 100. The RAM temporarily stores data used while CPU 23 executes a program and can also function as a temporary data memory used as a work area. The HDD is a non-volatile storage and can store data received from each unit and processed data. In addition to or instead of the HDD, a semiconductor storage such as a flash memory may be adopted.

CPU 23 develops a program stored in the ROM of memory 24 on the RAM or the like and executes the program. CPU 23 corresponds to one embodiment of the "calculator."

Display controller 25 is connected to display 29 through a wire or wirelessly. Display controller 25 outputs a signal representing display contents to display 29 in accordance with a command from CPU 23. When display 29 includes a touch panel, display controller 25 receives a signal representing a touch operation by an analyzer from display 29. Display 29 provides the analyzer with information on control of liquid chromatograph 100 and a result of analysis by liquid chromatograph 100.

Communication I/F 30 is connected to a communication I/F of each unit. Communication I/F 30 is an interface for communication of controller 28 with each unit and supplies and receives various signals to and from each unit.

(Description of Liquid Level Gauge 5)

Referring to FIG. 2, liquid level gauge 5 includes a CPU 55, a memory 56, a communication I/F 57, weight sensor 21, amplifier 51, and analog-digital converter 52. Components of liquid level gauge 5 are connected through a common system bus and can supply and receive a signal to and from one another through the system bus.

Liquid level gauge 5 operates in accordance with a program stored in memory 56. Memory 56 includes a ROM, a RAM, and an HDD which are not shown.

The ROM can store a program to be executed by CPU 55. The program includes a program relating to control of liquid level gauge 5. The RAM temporarily stores data to be used while CPU 55 executes a program and can function as a temporary data memory used as a work area. The HDD is a non-volatile storage and can store data received from controller 28 and processed data. In addition to or instead of the HDD, a semiconductor storage such as a flash memory may be adopted.

CPU 55 develops a program stored in the ROM of memory 56 on the RAM or the like and executes the program. CPU 55 implements filter 53, calculator 54, median value calculator 61, reference range setting unit 62, comparator 63, and determination unit 64 shown in FIG. 1.

Communication I/F 57 is connected to communication I/F 30 of controller 28. Communication I/F 57 is an interface for communication of liquid level gauge 5 with controller 28 and inputs and outputs various signals to and from controller 28.

In the liquid chromatograph, a configuration for detecting a liquid amount of a mobile phase that remains in container 20 by measuring with the weight sensor, a weight of the container during analysis may be adopted. A method of measuring a weight of a container in a liquid chromatograph according to a comparative example will be described below with reference to FIG. 3.

(Method of Measuring Weight in Liquid Chromatograph According to Comparative Example)

Figure 3:
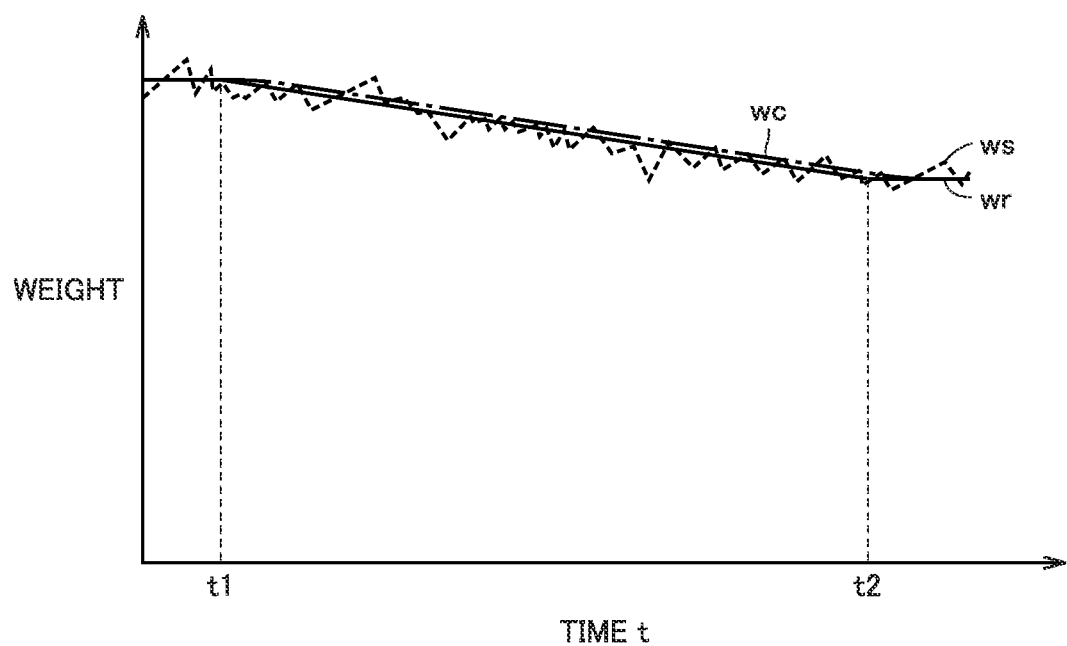
FIG. 3 is a diagram illustrating change over time of a weight of a container during analysis, a detection value from a weight sensor, and a value output from a filter.

FIG. 3 is a diagram illustrating change over time of a weight of the container during analysis, a detection value from the weight sensor, and a value output from the filter. The abscissa in FIG. 3 represents time t and the ordinate represents a weight. Time t1 represents time of start of use of a mobile phase in analysis. Time t2 represents time of end of use of the mobile phase in analysis.

Variation per unit time of the liquid amount of the mobile phase consumed in the liquid chromatograph during analysis is, for example, as small as 10 ml/minute at the maximum. Therefore, when an actual weight of the container is denoted as an actual weight wr, variation of actual weight wr during analysis is smaller than actual weight wr as shown in FIG. 3. Therefore, in the liquid chromatograph according to the comparative example, a weight sensor high in sensitivity capable of detecting small variation of weight wr is employed as the weight sensor.

The liquid chromatograph may normally be used in an environment such as a laboratory where vibration occurs. Vibration in the environment includes, for example, vibration of an analysis apparatus and vibration under normal conditions (vibration resulting from walking or vibration resulting from opening and closing of a door). Variation of a detection value from the weight sensor due to such vibration is often larger than variation of actual weight wr during analysis. A detection value from the weight sensor is denoted as a detected weight ws. Detected weight ws is calculated by superimposing fluctuation in value caused by vibration in the environment on a value of actual weight wr as shown in FIG. 3. Therefore, detected weight ws may not accurately reflect actual weight wr during analysis.

In order to solve this problem, in the liquid chromatograph according to the comparative example, an approach to removal of influence by vibration in the environment by smoothening detected weight ws through filtering processing is used. An output value from such a filter at certain time is denoted as an output weight wc. Output weight wc is output as an average value (that is, moving average) of a prescribed relatively large number of (for example, one hundred) detected weights ws detected at immediately preceding time points including that certain time. The filter for calculating a moving average value of a relatively large number of detected weights ws is thus also referred to as a filter large in time constant. Through such processing, output weight wc has a value from which influence by vibration has been eliminated, with influence by vibration in the environment having been canceled as shown in FIG. 3.

In the liquid chromatograph including the weight sensor that measures a weight of a container, an operation such as additional injection of a mobile phase or placement or removal of the container onto or from the weight sensor is also determined based on change of the weight of the container. Specifically, when detected weight ws greatly increases, it is determined that the mobile phase has additionally been injected into the container or the container has been placed on the weight sensor. When detected weight ws greatly decreases, it is determined that the container has been removed from the weight sensor. An operation such as additional injection of the mobile phase or placement or removal of the container onto or from the weight sensor that brings about such great change of the weight is herein also referred to as an "operation onto the system" below.

The liquid chromatograph including the filter large in time constant is able to detect such an operation onto the system, whereas responsiveness thereof remains an issue. Specifically, the time constant of the filter is large. Therefore, even though change of detected weight ws is abrupt, many values of detected weight ws before abrupt change are reflected on output weight wc. Therefore, change of output weight wc is gentle (which will be described in detail with reference to FIG. 6). Accordingly, for example, even when the mobile phase is additionally injected into the container, disadvantageously, a time period for which output weight wc greatly deviates from actual weight wr may be long and a time period until it is determined that the mobile phase has additionally been injected into the container may be long. Similarly, when the container is placed on the weight sensor and when the container is removed from the weight sensor as well, a time period until whether or not the container is on the weight sensor is determined is long.

(Method of Measuring Weight in Liquid Chromatograph According to Present Embodiment)

Then, a configuration for changing the time constant of the filter in accordance with variation of detected weight ws is adopted in liquid chromatograph 100 according to the present embodiment.

In order to realize such a configuration, liquid level gauge 5 in liquid chromatograph 100 according to the embodiment includes median value calculator 61, reference range setting unit 62, comparator 63, and determination unit 64 as shown in FIG. 1.

Referring again to FIG. 1, median value calculator 61 receives detected weight ws from analog-digital converter 52. Median value calculator 61 calculates a median value wm of detected weight ws. Median value wm is calculated, for example, based on data of a prescribed number Nc of recent detected weights ws. Data of detected weight ws may hereinafter simply also be referred to as "data". Nc represents a natural number and it is set, for example, to one hundred. Median value calculator 61 outputs median value wm to reference range setting unit 62.

Reference range setting unit 62 receives median value wm from median value calculator 61. Reference range setting unit 62 uses median value wm to set a reference range W1 of detected weights ws. Reference range W1 is a range for determining that actual weight wr has greatly fluctuated based on detected weight ws.

By way of example of reference range W1, in the present embodiment, an upper limit value WU of reference range W1 is set to WU=wm+k and a lower limit value WD of reference range W1 is set to WD=wm−k. k represents a positive real number, and it is defined as a threshold value set to be larger than fluctuation of detected weight ws caused by vibration in the environment. Threshold value k is set to be smaller than change of detected weight ws expected in the event of an "operation onto the system" such as additional injection of the mobile phase and placement and removal of the container. Reference range setting unit 62 outputs reference range W1 to comparator 63.

Comparator 63 receives detected weight ws from analog-digital converter 52 and receives reference range W1 from reference range setting unit 62. Comparator 63 compares detected weight ws and reference range W1 with each other and outputs a signal representing a result thereof (which is also referred to as a comparison signal below) to determination unit 64. Comparator 63 outputs a comparison signal at the H (logic high) level when detected weight ws is larger than upper limit value WU or smaller than lower limit value WD. Comparator 63 outputs a signal at the L (logic low) level when detected weight ws is equal to or larger than wm−k and equal to or smaller than wm+k.

Determination unit 64 includes a counter 65. Counter 65 counts the number of times that the comparison signal consecutively attains to the H level. Specifically, counter 65 counts the number of times that detected weight ws is consecutively out of reference range W1, based on the comparison signal received from comparator 63. Namely, counter 65 counts the number of times that a condition of ws<WD=(wm−k) or a condition of ws>WU=(wm+k) is consecutively satisfied. When the number reaches a prescribed number N1, determination unit 64 determines that actual weight wr has greatly fluctuated during a sampling period preceding the current sampling period by prescribed number N1. Prescribed number N1 is a natural number equal to or larger than two, and it is set, for example, to five. Determination unit 64 outputs a result of determination to filter 53. The reason why prescribed number N1 is provided is for prevention of erroneous determination about noise.

According to such a configuration, when variation of detected weight ws is smaller than threshold value k, it can be determined that an operation onto the system has not been performed, and when variation of detected weight ws is larger than threshold value k, it can be determined that an operation onto the system may have been performed. Variation of detected weight ws being larger than threshold value k herein includes both of decrement in detected weight ws being larger than k and increment in detected weight ws being larger than k.

In other words, it can be determined that an operation onto the system has not been performed when detected weight ws is within reference range W1 and it can be determined that an operation onto the system may have been performed when detected weight ws is out of reference range W1.

Filter 53 smoothens detected weight ws. Filter 53 receives a result of determination from determination unit 64 and changes a time constant for smoothening of detected weight ws based on the result of determination. Filter 53 smoothens detected weight ws based on the time constant and converts the detected weight into an output value of the filter. An output value of filter 53 according to the present embodiment is denoted as an output weight wi. Specifically, filter 53 changes the time constant by changing the number of pieces of data in calculating a moving average of detected weights ws. With increase in number of pieces of data to be used for moving average processing, the time constant is larger, and with decrease in number of pieces of data to be used for moving average processing, the time constant is smaller. Filter 53 outputs output weight wi to calculator 54.

Figure 4:
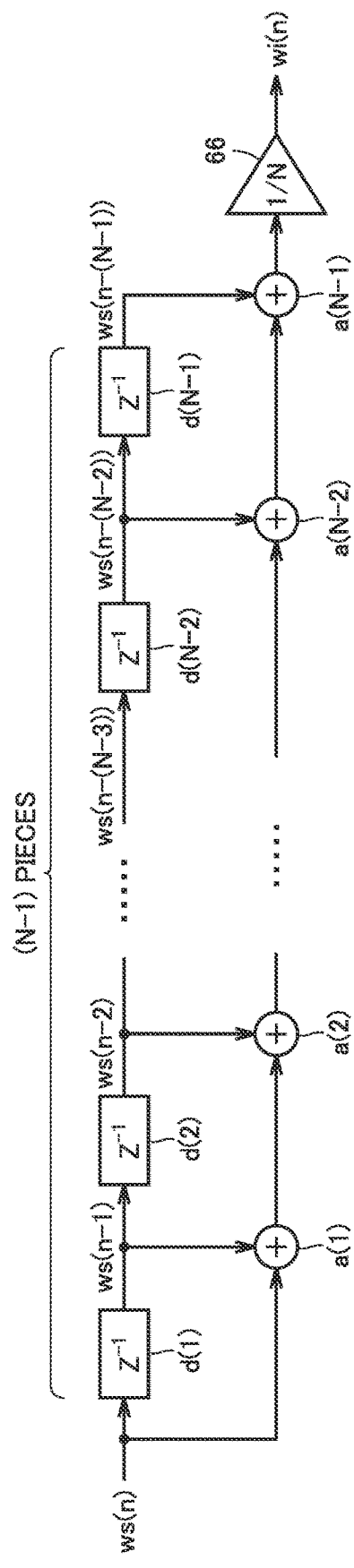
FIG. 4 is a diagram illustrating an exemplary configuration of the filter.

FIG. 4 is a diagram illustrating an exemplary configuration of filter 53. Referring to FIG. 4, filter 53 is a moving average filter including a plurality of delay circuits d, a plurality of adders a, and a divider 66.

In outputting a moving average value of N detected weights ws, the number of delay circuits d connected in series (which is also referred to as the number of stages below) is set to (N−1). The number of adders a connected in series is also set to (N−1). Detected weight ws during the current sampling period is denoted as ws(n). Delay circuit d in each stage outputs for each sampling period, detected weight ws during a sampling period preceding by one a sampling period during which input detected weight ws was obtained. Adder a in each stage adds an output signal from corresponding delay circuit d to an output signal from adder a in a preceding stage and outputs a result of addition to adder a in a next stage.

Specifically, when delay circuit d(1) in the first stage receives detected weight ws(n) during the current sampling period from analog-digital converter 52, it outputs detected weight ws(n−1) during a sampling period preceding by one to an adder a(1) in the first stage and a delay circuit d(2) in the second stage.

When delay circuit d(2) in the second stage receives detected weight ws(n−1) from delay circuit d(1) in the preceding stage, it outputs a detected weight ws(n−2) during a sampling period preceding by two to an adder a(2) in an identical stage and a delay circuit d(3) in a next stage. Hereafter, the processing is also similarly performed until a delay circuit d(N−2) in the (N−2)th stage.

A delay circuit d(N−1) in the last stage receives detected weight ws(n−(N−2)) during a sampling period preceding by (N−2) and outputs detected weight ws(n−(N−1)) during a sampling period preceding by (N−1) to an adder a(N−1) in the last stage.

Adder a(1) in the first stage adds detected weight ws(n) in the current sampling period from analog-digital converter 52 to detected weight ws(n−1) during the sampling period preceding by one from delay circuit d(1) in the first stage and outputs a value of addition (ws(n)+ws(n−1)) to adder a(2) in the next stage.

Adder a(2) in the second stage adds the output from adder a(1) in the preceding stage to the output from delay circuit d(2) in an identical stage, and outputs a value of addition to an adder a(3) in the next stage. Hereafter, the processing is also similarly performed until an adder a(N−2) in the (N−2)th stage.

An adder a(N−1) in the last stage adds the output from adder a(N−2) in the preceding stage to detected weight ws(n−(N−1)) which is the output from delay circuit d(N−1) in the last stage and outputs a result of addition to divider 66.

The value output from adder a(N−1) in the last stage is thus a total value ws(n)+ws(n−1)+ . . . +ws(n−(N−1)) of N detected weights ws during a period from the current sampling period until the sampling period preceding by (N−1).

Divider 66 outputs to calculator 54, a value calculated by dividing the value received from adder a(N−1) by the number of pieces of data N, that is, {ws(n)+ws(n−1)+ . . . +ws(n−(N−1))}/N, as an output weight wi(n).

Divider 66 outputs to calculator 54, a moving average value of detected weights ws over the N sampling periods as output weight wi.

In the moving average filter shown in FIG. 4, by increasing the number of delay circuits d connected in series, that is, by increasing the number of pieces of data to be used for moving average, a high-frequency component such as vibration included in an input value can be removed. With increase in number of delay circuits d connected in series, the time constant of the moving average filter tends to be large. Consequently, responsiveness of an output value to change of an input value is lowered.

In the moving average filter in the liquid chromatograph according to the comparative example, the number of delay circuits d connected in series is fixed to a prescribed value. Therefore, the time constant of output weight we is fixed.

In liquid chromatograph 100 according to the present embodiment, the number of serially connected delay circuits d that constitute filter 53 is changed. In other words, the time constant of output weight wi is variable.

Figure 5:
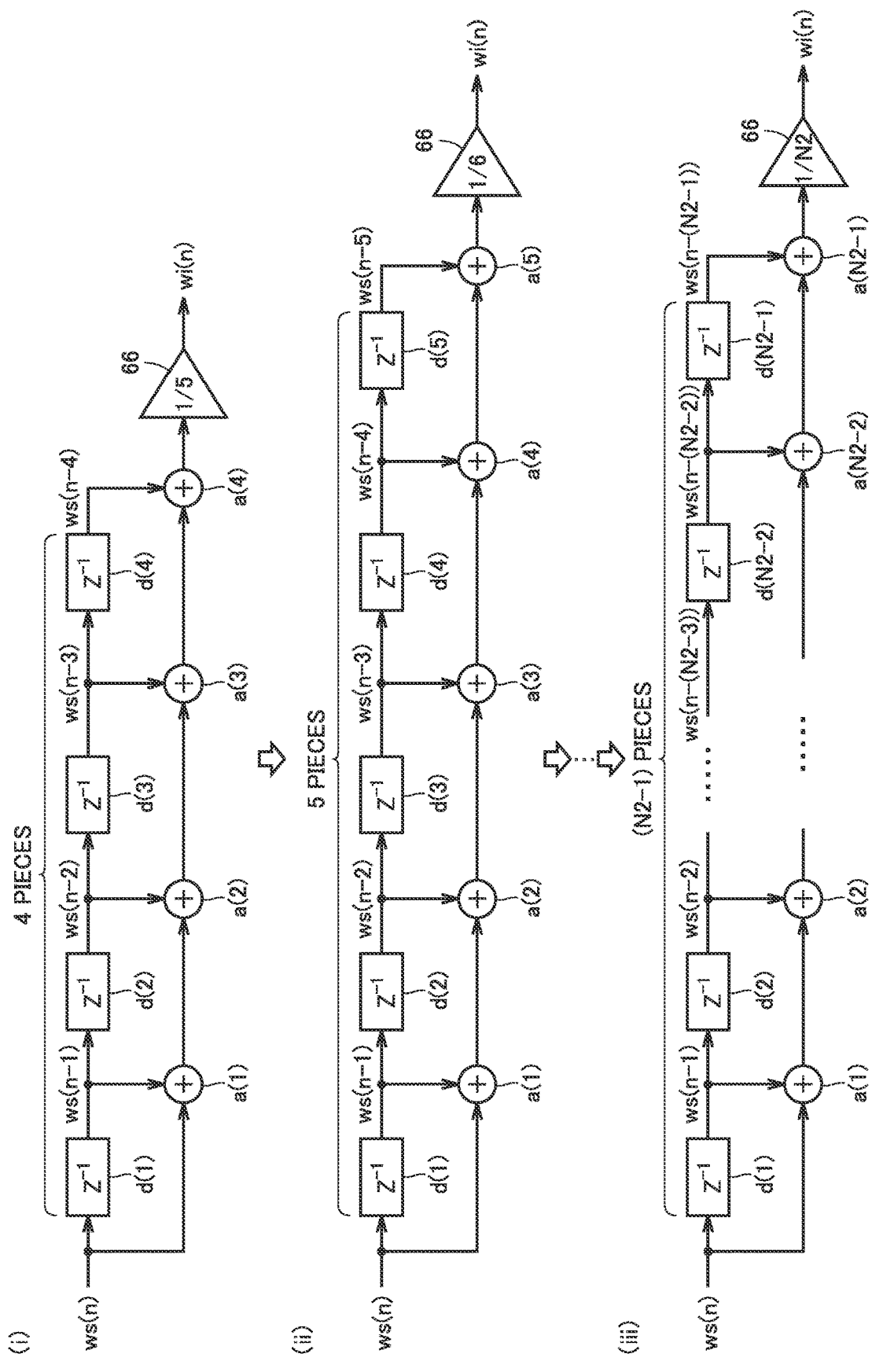
FIG. 5 is a diagram illustrating an exemplary configuration for changing a time constant of the filter.

FIG. 5 is a diagram illustrating an exemplary configuration for changing a time constant of filter 53. In filter 53, when "change of detected weight ws exceeding reference range W1" occurs, the number of stages of delay circuits d and adders a is changed in accordance with the number of pieces of data obtained after "change of detected weight ws exceeding reference range W1."

FIG. 5 (*i*) shows a configuration of filter 53 when "change of detected weight ws exceeding reference range W1" occurs in data preceding by N1 pieces (five pieces in this example). In such a case, by setting the number of stages of delay circuits d to N1−1=4, filter 53 outputs as output weight wi, an average value of data of five detected weights ws from the time point of occurrence of "change of detected weight ws exceeding reference range W1." Therefore, filter 53 can calculate the moving average value only of data from the time point of "change of detected weight ws exceeding reference range W1." With decrease in number of pieces of data to be used for moving average, the time constant of filter 53 is smaller than before occurrence of change.

FIG. 5 (*ii*) shows a configuration of filter 53 during a sampling period following FIG. 5 (*i*), that is, when a piece of data sixth from the time point of occurrence of "change of detected weight ws exceeding reference range W1" is obtained. In such a case, the number of stages of delay circuits d is increased by one as compared with the number during the previous sampling period, and set to five.

Thus, in liquid chromatograph 100, when determination unit 64 determines that "change of detected weight ws exceeding reference range W1" corresponding to an operation onto the system has occurred, the number of delay circuits in filter 53 is smaller than before determination, and hence the time constant of filter 53 can be smaller. In other words, when variation per sampling period of detected weight ws is larger than threshold value k, the number of stages of delay circuits d to be used for moving average processing is smaller than when variation per sampling period is smaller than threshold value k, and hence the number of pieces of data to be used for processing by filter 53 is smaller.

During a period from the time point of occurrence of "change of detected weight ws exceeding reference range W1" until occurrence of next "change of detected weight ws exceeding reference range W1," that is, in a state that an operation onto the system is not performed, the number of stages of delay circuits d is increased one by one for each sampling period, and hence the time constant of filter 53 gradually becomes larger. Therefore, an effect of attenuation of fluctuation of detected weight ws due to vibration in the environment can be obtained. In other words, when variation of detected weight ws is small, a filter large in time constant can be used.

When the number of stages of delay circuits d is too large, load imposed by calculation in the calculator becomes high and responsiveness may be compromised to the contrary. Therefore, an upper limit value is desirably provided for the number of stages of delay circuits d. In liquid chromatograph 100 in the present embodiment, the upper limit of the number of stages of delay circuits d is fixed to a prescribed value N2 as in FIG. 5 (*iii*). Prescribed number N2 is set to a value that allows sufficient attenuation of fluctuation of detected weight ws caused by vibration in the environment while "change of detected weight ws exceeding reference range W1" is not occurring and allows an amount of calculation in filter 53 not to be too large. N2 represents a natural number, and it is set, for example, to one hundred.

In liquid chromatograph 100 according to the present embodiment, the number of pieces of data to be used for processing in filter 53 is decreased from prescribed number N2 to prescribed number N1, and thereafter the number of pieces of data to be used for processing in filter 53 is increased stepwise from prescribed number N1 to prescribed number N2. Prescribed number N2 corresponds to one embodiment of a "first value." Prescribed number N1 corresponds to one embodiment of a "second value."

Thus, liquid chromatograph 100 according to the present embodiment accurately detects change of actual weight wr during analysis similarly to the liquid chromatograph according to the comparative example, and simultaneously, also achieves improved responsiveness to actual weight wr at the time of an operation onto the system which has been an issue in the liquid chromatograph according to the comparative example.

In calculation of output weight wi, when the number of times of consecutive generation of data where detected weight ws is out of reference range W1 is smaller than N1, detected data is highly likely to be noise. Therefore, such data is desirably eliminated. By doing so, influence by noise can be suppressed.

Change of output weight wi in liquid chromatograph 100 according to the present embodiment at the time when the container is removed from the weight sensor will be described below by way of example of the operation onto the system.

Figure 6:
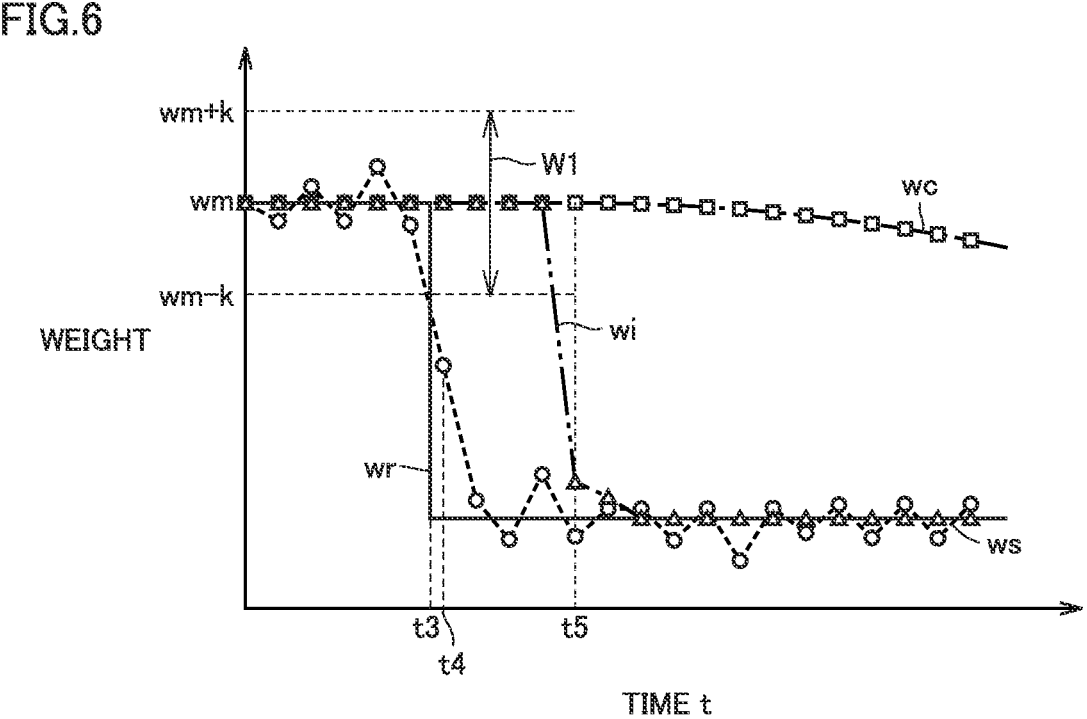
FIG. 6 is a diagram illustrating change of an actual weight, a detected weight, and an output weight at the time when the container is removed.

FIG. 6 is a diagram illustrating change of actual weight wr, detected weight ws, and output weight wi at the time when the container is removed. The abscissa in FIG. 6 represents time t and the ordinate represents a weight. A point in each line graph represents a value corresponding to each piece of data at each time.

Referring to FIG. 6, an example where container 20 is removed from weight sensor 21 at time t3 is discussed. When actual weight wr abruptly decreases at time t3, with this decrease, detected weight ws also abruptly decreases immediately after time t3. Time at which this abrupt decrease in detected weight ws is measured is denoted as time t4.

At this time, for the filter in the comparative example, the number of pieces of data to be used for moving average processing is fixed and the time constant is fixed. Therefore, output weight wc hardly changes also after time t3. Therefore, when the container is removed, a time period for which output weight wc in the comparative example greatly deviates from actual weight wr lasts for a long time. As the number of pieces of data to be used for moving average processing is larger, this time period is longer.

In liquid chromatograph 100 according to the present embodiment, when container 20 is removed at time t3, actual weight wr abruptly decreases. Following such decrease, detected weight ws also abruptly decreases at time t4 and detected weight ws is out of reference range W1. When the number N of pieces of data of detected weight ws out of reference range W1 is smaller than prescribed number N1 (five pieces here), such abrupt change of detected weight ws may have been caused by noise. Therefore, it is not determined that actual weight wr has greatly fluctuated. At the time point when there are at least prescribed number N1 of consecutive pieces of data of detected weight ws out of reference range W1, it is determined that actual weight wr has greatly fluctuated in data preceding by N1 pieces. At time t5, the number of stages of delay circuits d in filter 53 is set to N1−1=4 and output weight wi is calculated as the average value of five pieces of data from time t4.

When a state that variation of detected weight ws per sampling period is larger than threshold value k is detected over a plurality of consecutive sampling periods, filter 53 performs filtering processing on detected weights from the plurality of consecutive sampling periods.

From data following the data at time 5, each time the number of pieces of data increases by one, the number of stages of delay circuits d in filter 53 increases one by one. Namely, output weight wi is calculated as the average value of pieces of data from time t4.

When the number of pieces of data from time t4 is equal to or larger than prescribed number N2, the number of stages of delay circuits d in filter 53 is fixed to (N2−1). Therefore, in such a case, output weight wi is calculated as the average value of most recent N2 pieces of data.

From time t5, output weight wi is close to actual weight wr. In other words, in the liquid chromatograph according to the present embodiment, a time period until output weight wi is close to actual weight wr is shorter than in the liquid chromatograph in the comparative example.

Figure 7:
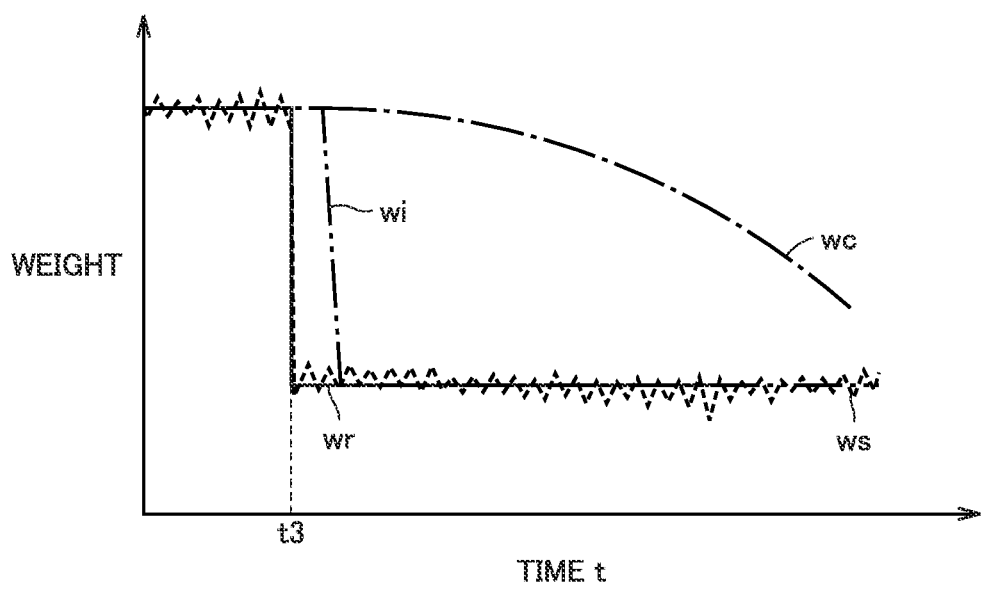
FIG. 7 is a diagram showing a graph in FIG. 6 over a longer time span.

FIG. 7 is a diagram showing the graph in FIG. 6 over a longer time span. Referring to FIGS. 6 and 7, output weight wi according to the embodiment of the present invention in which a time constant is changed depending on variation of detected weight ws follows great change of actual weight wr caused by removal of the container more quickly than output weight we according to the comparative example in which a time constant is constantly large regardless of variation of detected weight ws. Therefore, liquid chromatograph 100 according to the present embodiment is higher in responsiveness of an output value from filter 53 when an "operation onto the system" is performed. Therefore, the operation onto the system can accurately be detected based on the output value from filter 53.

Though at most prescribed number N2 of detected weights ws are averaged for calculation of output weight wi in the present embodiment, a range of detected weights ws to be used for calculation of output weight wi is not limited thereto. For example, an embodiment in which detected weights ws within a prescribed temporal range are averaged may be adopted as a method of calculating output weight wi. The method of calculating output weight wi is not limited to simple average, and the method may also use, for example, a median value. Moving average is not limited to simple moving average but may be weighted moving average or exponential moving average. Filter 53 is not limited to a moving average filter but may be a finite impulse response (FIR) filter.

Threshold value k is not limited either to the definition based on the method above, and threshold value k should only be set to be larger than variation of detected weight ws caused by vibration in the environment and smaller than variation of detected weight ws caused by an operation onto the system.

Figure 8:
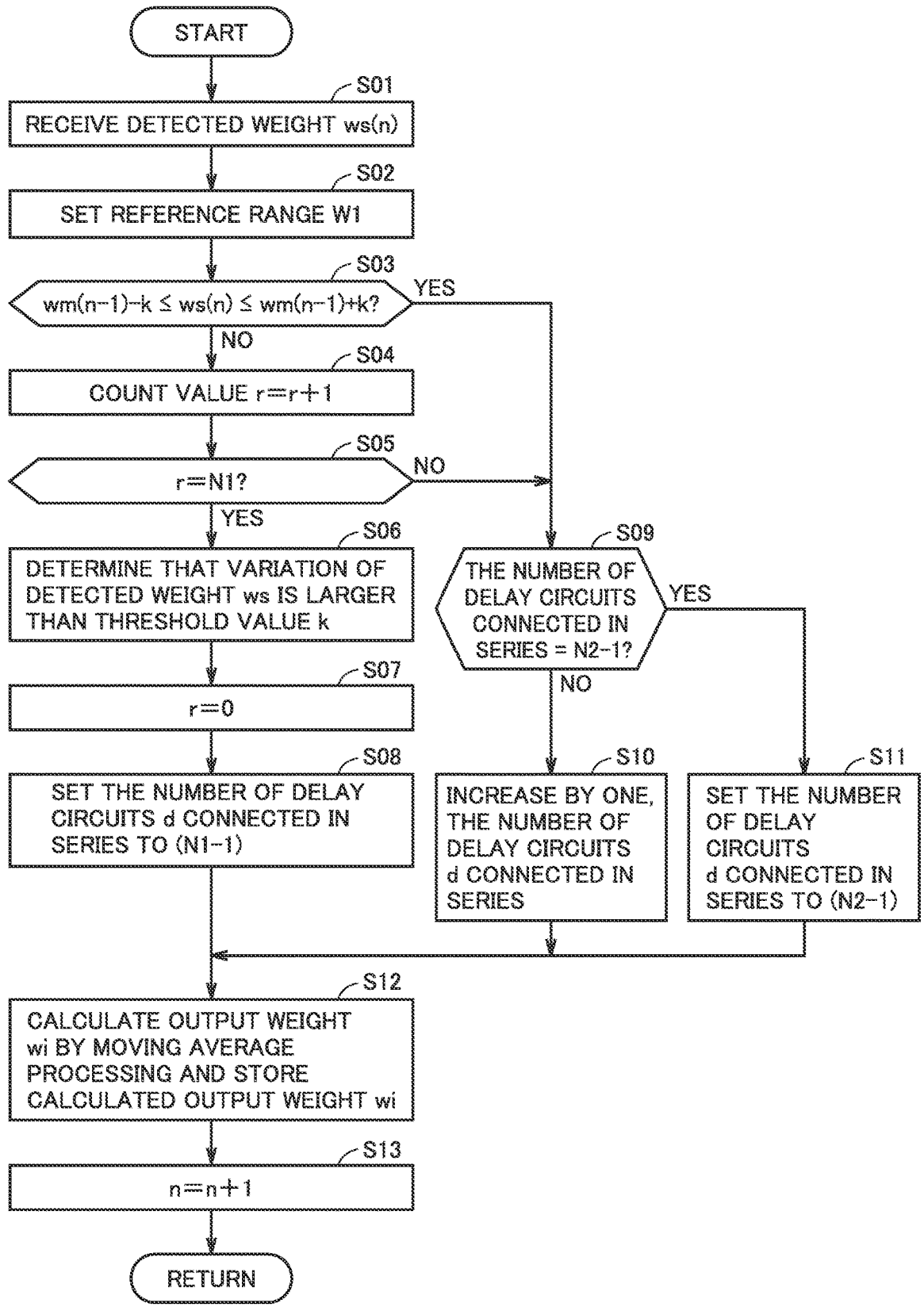
FIG. 8 is a flowchart showing exemplary filtering processing according to the present embodiment.

FIG. 8 is a flowchart showing exemplary filtering processing performed in liquid level gauge 5 of liquid chromatograph 100 according to the present embodiment. The flowchart in FIG. 8 is repeatedly performed by CPU 55 of liquid level gauge 5 for each sampling period of the ADC. In the description with reference to FIG. 8, detected weight ws(n) represents data of detected weight ws during the present sampling period (n being a natural number). This is also similarly applicable to other variables.

Referring to FIG. 8, in step S01 CPU 55 receives detected weight ws(n) from weight sensor 21. In step S02, CPU 55 sets reference range W1. Specifically, CPU 55 sets upper limit value WU and lower limit value WL of reference range W1 based on detected weight ws(n) and threshold value k.

In step S03, CPU 55 determines whether or not detected weight ws(n) is within reference range W1 set during the previous sampling period. Namely, CPU 55 determines whether or not detected weight ws(n) satisfies a condition of wm(n−1)−k≤ws(n)≤wm(n−1)+k.

When detected weight ws(n) does not satisfy the condition of wm(n−1)−k≤ws(n)≤wm(n−1)+k (NO in step S03), CPU 55 increases a count value r by one in step S04. Count value r is an integer not smaller than 0 and not larger than N1 and it is a value for counting the number of times that detected weight ws is consecutively out of reference range W1.

In step S05, CPU 55 determines whether or not count value r satisfies a condition of r=N1. When the condition of count value r=N1 is satisfied (YES in step S05), CPU 55 determines in step S06 that variation of detected weight ws is larger than threshold value k. Namely, the CPU determines that actual weight wr has greatly fluctuated in data during a sampling period preceding the current sampling period by N1. In step S07 that follows, CPU 55 sets count value r to 0. In step S08, CPU 55 sets the number of delay circuits d connected in series in filter 53 to (N1−1) and allows the process to proceed to step S12.

When detected weight ws(n) satisfies the condition of wm(n−1)−k≤ws(n)≤wm(n−1)+k (YES in step S03) or count value r does not satisfy the condition of r=N1 (NO in step S05), CPU 55 allows the process to proceed to step S09 and determines whether or not the number of delay circuits d connected in series in filter 53 is (N2−1).

When the number of delay circuits d connected in series is not (N2−1) (NO in step S09), CPU 55 increases the number of delay circuits d connected in series by one and allows the process to proceed to step S12. When the number of delay circuits d connected in series is (N2−1) (YES in step S09), CPU 55 maintains the number of delay circuits d connected in series at (N2−1) and allows the process to proceed to step S12.

In step S12, CPU 55 calculates output weight wi by performing moving average processing with the use of serially connected delay circuits d as many as the number determined in steps S08, S10, and S11, and has memory 56 store calculated output weight wi. CPU 55 calculates a liquid amount of the mobile phase based on output weight wi, and outputs the liquid amount to controller 28 through communication I/F 57. Controller 28 can notify a user of the liquid amount of the mobile phase by having display 29 show the liquid amount of the mobile phase.

In step S13, CPU 55 increases n by one and allows the process to return to step S01.

Through the processing as above, when detected weight ws greatly fluctuates, liquid chromatograph 100 according to the present embodiment calculates output weight wi with the time constant of the filter for smoothening of detected weight ws being made smaller. Thus, when an operation onto the system such as additional injection of the mobile phase and placement and removal of the container which greatly fluctuates the liquid amount of the mobile phase is performed, liquid chromatograph 100 can detect the liquid amount of the mobile phase with high responsiveness. When detected weight ws does not greatly fluctuate, the time constant of the filter can be made larger to accurately detect also the liquid amount of the mobile phase in a situation that no operation onto the system is performed (for example, during analysis). Therefore, a liquid chromatograph that can accurately detect, with the weight sensor, a remaining amount of a mobile phase during analysis and also an operation onto the system such as whether or not a container has been placed and whether or not the mobile phase has additionally been injected can be provided.

[Aspects]

A plurality of exemplary embodiments described above are understood by a person skilled in the art as specific examples of aspects below.

(First Aspect)

A liquid chromatograph according to one aspect includes a container that stores a mobile phase, a sensor that detects a weight of the container where the mobile phase is stored, a filter that smoothens a signal output from the sensor and outputs the smoothened signal, and a calculator that calculates a liquid amount of the mobile phase stored in the container based on the signal output from the filter. When variation per unit time of the signal output from the sensor is larger than a prescribed threshold value, a time constant of the filter for smoothening may be smaller than when variation is smaller than the threshold value.

According to the liquid chromatograph described in the first aspect, with the weight sensor, a remaining amount of the mobile phase during analysis can accurately be detected and an operation onto the system such as whether or not the container has been placed or whether or not the mobile phase has additionally been injected can also accurately be detected.

(Second Aspect)

In the liquid chromatograph according to the first aspect, the signal output from the sensor is an analog signal. The liquid chromatograph further includes an analog-digital converter that converts the signal output from the sensor into a digital signal by sampling the signal over a prescribed sampling period and outputs the digital signal to the filter. The filter is a digital filter that performs filtering processing on the digital signal output from the analog-digital converter. When variation of the digital signal per sampling period is larger than the threshold value, the number of pieces of data to be used for filtering processing by the digital filter may be smaller than when variation per sampling period is smaller than the threshold value.

According to the liquid chromatograph described in the second aspect, when a weight of the container abruptly changes and change larger than the threshold value occurs in the signal output from the sensor, a ratio based on data from the time point of occurrence of change can be increased in data to be subjected to filtering processing. Therefore, in this case, the time constant of the digital filter can be made smaller so that the output weight from the digital filter can quickly follow change of the weight of the container.

(Third Aspect)

In the liquid chromatograph described in the second aspect, the digital filter is a moving average filter including delay circuits connected in series. When variation per sampling period of the digital signal is larger than the threshold value, the moving average filter is smaller in number of delay circuits to be used for moving average processing than when variation per sampling period is smaller than the threshold value.

According to the liquid chromatograph described in the third aspect, when the weight of the container abruptly changes and change larger than the threshold value occurs in the signal output from the sensor, the time constant of the moving average filter can be made smaller by decreasing the number of delay circuits to be used for moving average processing. Therefore, in this case, the signal output from the digital filter can quickly follow change of the weight of the container.

(Fourth Aspect)

In the liquid chromatograph described in the second or third aspect, when a state that variation per sampling period is larger than the threshold value is detected over a plurality of consecutive sampling periods, the digital filter performs filtering processing on the digital signal from the plurality of consecutive sampling periods.

When the signal output from the sensor is larger than the threshold value but such a state does not continue over a plurality of sampling periods, the signal output from the sensor is highly likely to be noise. Therefore, according to the liquid chromatograph described in the fourth aspect, erroneous determination as to noise can be prevented. By subjecting data from the time point of occurrence of change of the signal output from the sensor to filtering processing, the time constant of the digital filter can be made smaller.

(Fifth Aspect)

In the liquid chromatograph described in any one of the second to fourth aspects, the number of pieces of data to be used for the filtering processing by the digital filter may be decreased from a first value to a second value smaller than the first value and thereafter the number of pieces of data to be used for filtering processing may be increased stepwise from the second value to the first value.

According to the liquid chromatograph described in the fifth aspect, during a period after occurrence of change larger than the threshold value in the signal output from the sensor until occurrence of next change larger than the threshold value, the number of pieces of data to be used for filtering processing can be increased stepwise to the first value (for example, one hundred). Therefore, in such a case, an effect of attenuation of vibration in the environment while stability of the signal output from the filter is maintained can be obtained.

Though an embodiment of the present invention has been described, it should be understood that the embodiment disclosed herein is illustrative and non-restrictive in every respect. The scope of the present invention is defined by the terms of the claims and is intended to include any modifications within the scope and meaning equivalent to the terms of the claims.

What is claimed is:

1. A liquid chromatograph comprising:
a container that stores a mobile phase;
a sensor that detects a weight of the container in which the mobile phase is stored;

a filter that smoothens a signal output from the sensor and outputs the smoothened signal; and a calculator that calculates a liquid amount of the mobile phase stored in the container based on the signal output from the filter, wherein when variation per unit time of the signal output from the sensor is larger than a prescribed threshold value, a time constant of the filter for smoothening is smaller than when the variation is smaller than the threshold value.

2. The liquid chromatograph according to claim 1, wherein the signal output from the sensor is an analog signal, the liquid chromatograph further comprises an analog-digital converter that converts the signal output from the sensor into a digital signal by sampling the signal output from the sensor over a prescribed sampling period and outputs the digital signal to the filter, the filter is a digital filter that subjects the digital signal output from the analog-digital converter to filtering processing, and when variation per sampling period of the digital signal is larger than the threshold value, the number of pieces of data to be used for the filtering processing by the digital filter is made smaller than when the variation per sampling period is smaller than the threshold value.

3. The liquid chromatograph according to claim 2, wherein the digital filter is a moving average filter including delay circuits connected in series, and when the variation per sampling period of the digital signal is larger than the threshold value, the moving average filter includes a smaller number of delay circuits to be used for moving average processing than when the variation per sampling period is smaller than the threshold value.

4. The liquid chromatograph according to claim 2, wherein when a state that the variation per sampling period is larger than the threshold value is detected over a plurality of consecutive sampling periods, the digital filter performs the filtering processing on the digital signal from the plurality of consecutive sampling periods.

5. The liquid chromatograph according to claim 2, wherein the number of pieces of data to be used for the filtering processing by the digital filter is decreased from a first value to a second value smaller than the first value and thereafter the number of pieces of data to be used for the filtering processing is increased stepwise from the second value to the first value.

6. The liquid chromatograph according to claim 3, wherein when a state that the variation per sampling period is larger than the threshold value is detected over a plurality of consecutive sampling periods, the digital filter performs the filtering processing on the digital signal from the plurality of consecutive sampling periods.

7. The liquid chromatograph according to claim 3, wherein the number of pieces of data to be used for the filtering processing by the digital filter is decreased from a first value to a second value smaller than the first value and thereafter the number of pieces of data to be used for the filtering processing is increased stepwise from the second value to the first value.

8. The liquid chromatograph according to claim 4, wherein the number of pieces of data to be used for the filtering processing by the digital filter is decreased from a first value to a second value smaller than the first value and thereafter the number of pieces of data to be used for the filtering processing is increased stepwise from the second value to the first value.

* * * * *